Oct. 15, 1935.  E. R. MILLIS  2,017,701
DEVICE FOR MAKING COFFEE AND THE LIKE
Filed July 2, 1934
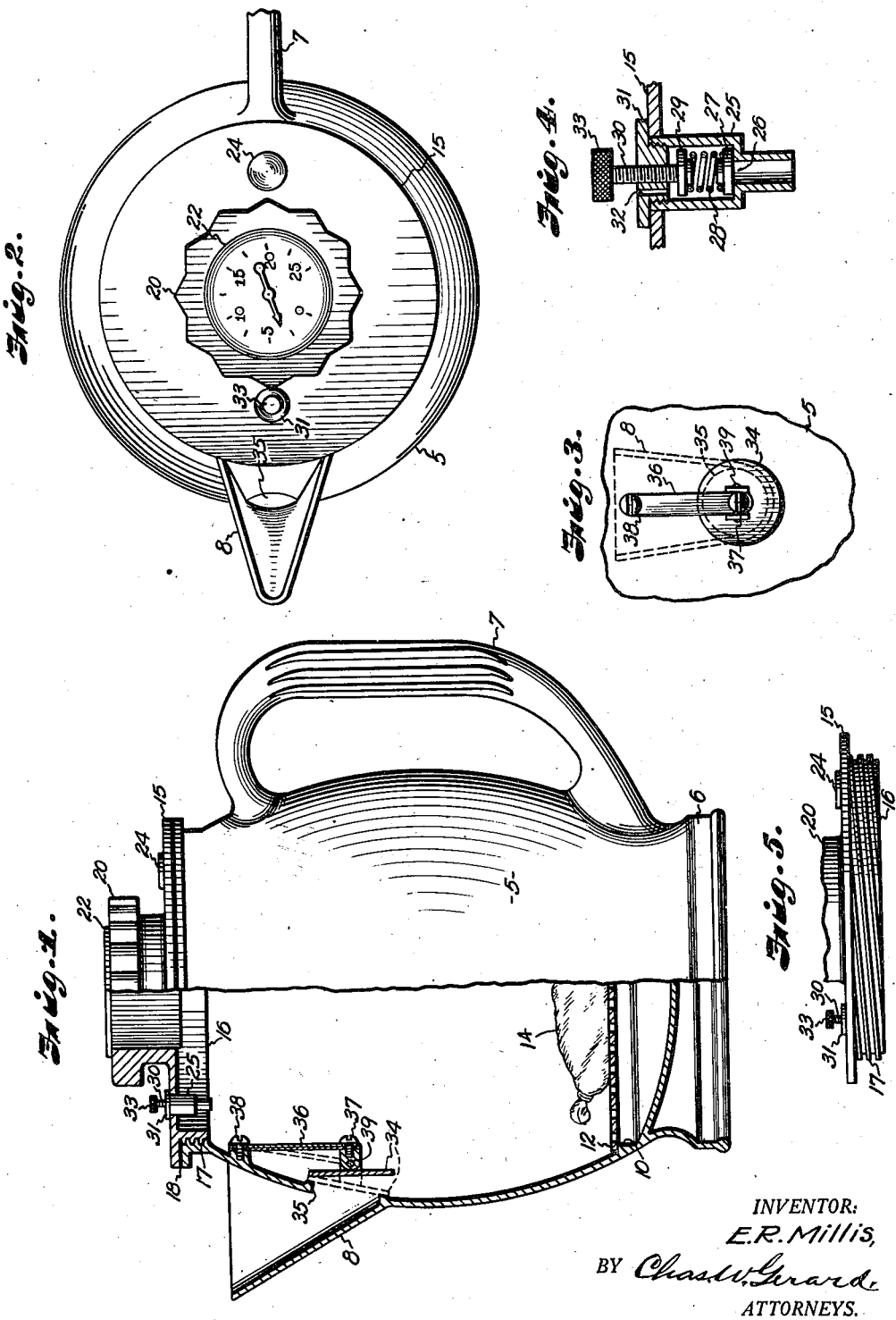
INVENTOR:
E. R. Millis,
BY Chas. W. Gerard,
ATTORNEYS.

Patented Oct. 15, 1935

2,017,701

UNITED STATES PATENT OFFICE 2,017,701

DEVICE FOR MAKING COFFEE AND THE LIKE

Earl R. Millis, Kansas City, Mo.

Application July 2, 1934, Serial No. 733,399

3 Claims. (Cl. 53—3)

The present invention relates to devices for the making of coffee or other beverages which are prepared by the making of an infusion from the coffee or other ingredients from which the beverage is to be produced.

The primary object in view is to produce such a beverage in which practically all the volatile oils and properties which give the beverage its peculiar aroma and flavor will be preserved.

For accomplishing this purpose I provide means for brewing the beverage under appropriate steam pressure, together with means of regulation or control for safety purposes as well as for varying the operating conditions, and all comprised within a simple, convenient, and neatly and compactly constructed appliance for household use.

One important feature of the invention is the provision of an improved thermostatic valve device which acts automatically to permit the escape of air from the pot or vessel until the boiling point is reached and thereafter closes to maintain proper pressure conditions until the preparation of the infusion is complete.

With the foregoing general objects in view, the invention will now be described by reference to the accompanying drawing illustrating a practical and efficient device for the purposes of the invention, after which those features and combinations deemed to be novel and patentable will be particularly set forth and claimed.

In the drawing—

Figure 1 is a side elevation illustrating a beverage making device constructed in accordance with the present invention;

Figure 2 is a plan view of the same;

Figure 3 is a fragmentary detail view showing the thermostatic valve for controlling the outlet through the pouring spout during the operation of making the infusion;

Figure 4 is a sectional detail of the adjustable pressure-release valve—on a larger scale; and Figure 5 is a detail view of the threaded portion of the lid or cover member.

Referring now to the drawing, this shows the improved construction as comprising a pot or vessel 5 having a suitable base portion 6, handle member 7 and a pouring spout 8.

Within the bottom portion of the pot is formed a ledge 10 for supporting a removable grill plate or false bottom 12 in position underlying a bag 14 containing the coffee or other material from which the beverage infusion is to be made,—as illustrated in Figure 1.

The lid or cover member 15 is formed with a flange 16 fitting inside the top opening of the pot and engageable therewith by suitable high-pitch threads 17 for easy and quick opening purposes, as by merely a part-turn of the lid. A suitable gasket 18 is interposed between the outer edges of the lid and the margin of said top opening of the pot or vessel 5.

The upper face of the lid or cover 15 is formed with a knob 20 of generous size as shown, for enabling the operator to easily turn the lid in engaging or disengaging the threads 17, for applying or removing the lid. Preferably, this knob 20 is utilized as a particularly convenient and appropriate means for the mounting of a pressure gage 22 for indicating the degree of steam pressure within the pot, the top face of the knob forming a most suitable location for accommodating the dial face of said gage centrally and in the uppermost as well as most conspicuous position on the cover member.

This lid or cover member 15 may also be provided with a fusible plug 24 adapted to provide a vent under excessive temperature conditions, as well as an adjustable pressure-release valve comprising a tubular element 25 providing an outlet port 26 normally closed by a closure disk or valve 27 under the pressure of a coil spring 28, the action of which is regulated by a disk 29 carried by a stem 30 threaded through a cap 31 which is screwed into the outer end of the tubular element 25 and formed with a vent opening 32, as illustrated in Figure 4. By the adjustment of the stem 30 by means of its knurled head 33, it is evident that the spring action of the valve or closure disk 27 may be conveniently regulated to set the valve for opening at any given pressure, with a view to maintaining appropriate pressure conditions within the pot and guarding against the same exceeding said given pressure.

During the process of preparing the infusion it is also necessary to close the outlet through the spout 8, for which purpose I provide a valve or closure disk 34 adapted to fit over and close the opening 35 from the pot into said spout; and to provide an automatic thermostatic action I mount said disk on the end of a suitable thermostatic element, such as a bimetallic link 36 secured to the disk by means of a screw 37 at one end of said link, and having its other end attached by a screw 38 to the interior of the vessel 5. The arrangement and construction are such that the strap link or thermostatic element 36 normally supports the valve or closure disk in open relation to the opening 35 for allowing free movement of air therethrough during the initial heating operation; but as the temperature rises to the boiling point and steam is formed, the action of the thermostatic element causes it to gradually swing the disk 34 toward the opening 35, thereby gradually obstructing the passage therethrough and finally closing the same during the remainder of the process of preparing the infusion, or so long as the temperature remains high enough to actuate said thermostatic element in the manner described. To insure proper seating of the disk 34 around the opening 35, the disk is preferably pivotally mounted, as indicated at 39.

The object of my invention being to prepare the coffee or other beverage infusion in a closed pot or vessel and under such a pressure as to preserve all the volatile oils and other properties which give the beverage its peculiar aroma and flavor, it will be readily apparent that this is accomplished by the closing of the pot by means of the lid 15 after the proper amount of liquid has been placed in the pot (with the bag 14 containing the coffee or other ingredient overlying the perforated plate 12), and placing the pot upon the stove or other heating appliance. In the initial heating operation, before the temperature reaches the boiling point, the thermostatic element 36 is not affected sufficiently to close the outlet 35 by means of the valve disk 34, so that air within the pot may be driven out through the spout; but as the temperature rises to the boiling point, said thermostatic element acts automatically to close the outlet 35, and the pressure produced by the steam vapor continues to rise within the pot, within the limit set by regulation of the spring pressure applied to the pressure-release valve 27, as already explained. Since different grades or qualities (or blends) of coffee, or other ingredients, give different results as regards the character of beverage produced under different steam pressures, as well as from different lengths of cooking or brewing periods, the provision of the means for regulating the operating pressure by the adjustment of the pressure-release valve 27, enables the user of the device to adapt the conditions for producing the proper infusion to these varying grades, blends or qualities of materials used.

Since the valve disk 34 remains closed during the principal infusion period, it is seen that none of the volatile substances are allowed to escape, but are held within the pot to preserve the desired flavor and aroma of the beverage, so that this loses none of the properties which are otherwise lost when no provision is made for retaining them throughout the process of preparing the beverage. Thus all the active principles of the ingredients are preserved, including all its aromatic properties or bouquet flavor; and besides producing an infusion of superior quality there is a great advantage as regards economy since a given quantity of the ingredients produces a greater quantity of the beverage, and lower or inferior grades of the ingredients may be used with much better results in the way of producing a palatable and satisfactory beverage.

After the infusion has been prepared it will be understood that on removal of the pot from the heating appliance, the drop in temperature will result in automatic opening of the valve disk 34 and permit pouring of the beverage out through the spout 8.

While I have shown and described what has been found to constitute a satisfactory form of embodiment of the improved device, I desire to be understood as reserving the right to make whatever changes or modifications may fairly fall within the spirit and scope of the appended claims.

Having thus described my invention, what I claim as new and desire to secure by Letters-Patent is:—

1. In a coffee or tea brewing vessel, a pot providing a brewing chamber, a main exterior pouring spout communicating with said chamber, a thermostatic valve controlling the outlet through said spout, and thermostatically actuated means responsive to temperature changes in the upper portion of the chamber and operatively connected with said valve to close the same on a predetermined rise in temperature in said upper portion of the chamber.

2. In a coffee or tea brewing vessel, a pot providing a brewing chamber provided with a removable cover member, a main exterior pouring spout communicating with said chamber, a thermostatic valve controlling the outlet through said spout, and thermostatically actuated means responsive to temperature changes in the upper portion of the chamber and operatively connected with said valve to actuate the same in response to temperature changes in said upper portion of the chamber.

3. In a coffee or tea brewing vessel, a pot providing a brewing chamber, a main exterior pouring spout communicating with said chamber, a thermostatic valve controlling the outlet through said spout, and a thermostatic element supporting said valve, said element being located in position for rendering the same responsive to temperature changes in the upper portion of said chamber and operative to close said valve on a predetermined rise in temperature in said upper portion of the chamber.

EARL R. MILLIS.